(12) United States Patent
Fukuda et al.

(10) Patent No.: US 6,999,732 B2
(45) Date of Patent: Feb. 14, 2006

(54) TRANSCEIVER ADAPTED FOR MOUNTING UPON A STRAP OF FACEPIECE OR HEADGEAR

(76) Inventors: Mikio Fukuda, c/o Temco Japan Co., Ltd., 12-26, Hounan 2-chome, Suginami-ku, Tokyo (JP); Tomoya Atsumi, c/o Temco Japan Co., Ltd., 12-26, Hounan 2-chome, Suginami-ku, Tokyo (JP)

(*) Notice: Subject to any disclaimer, the term of this patent is extended or adjusted under 35 U.S.C. 154(b) by 329 days.

(21) Appl. No.: 10/283,182

(22) Filed: Oct. 30, 2002

(65) Prior Publication Data
US 2003/0083112 A1 May 1, 2003

(30) Foreign Application Priority Data
Oct. 30, 2001 (JP) .............................. 2001-331870

(51) Int. Cl.
*H04B 1/034* (2006.01)
(52) U.S. Cl. ...................... 455/100; 455/350; 381/151
(58) Field of Classification Search ................ 455/100, 455/351, 41.2, 350; 381/334, 151; 235/472.02; 379/174, 430
See application file for complete search history.

(56) References Cited

U.S. PATENT DOCUMENTS

| 4,491,699 A * | 1/1985 | Walker ........................ 379/174 |
| 2002/0017567 A1 * | 2/2002 | Connolly et al. ....... 235/472.02 |
| 2003/0068057 A1 * | 4/2003 | Miller et al. ................. 381/334 |

* cited by examiner

*Primary Examiner*—Sonny Trinh
*Assistant Examiner*—Phuoc Doan
(74) *Attorney, Agent, or Firm*—Browdy and Neimark, PLLC

(57) ABSTRACT

A transceiver adapted for mounting upon straps of a gas mask or a helmet is smaller in size and weight, and therefore excellent in fittingness, which makes handling of the transceiver less cumbersome even when a user wears the gas mask or the helmet. The transceiver enables a user to communicate with his or her communication partner even when the user does his or her own work. In construction, the transceiver (1) has a rotatable casing (2). The casing (2) receives therein a bone conduction speaker portion (3) and a bone conduction microphone (4), and is pivoted to a supporting member (5). The supporting member (5) is provided with engaging means (7 and 8), which engage with straps (11 and 12), respectively.

6 Claims, 4 Drawing Sheets

TRANSCEIVER ADAPTED FOR MOUNTING UPON A STRAP OF FACEPIECE OR HEADGEAR

BACKGROUND OF THE INVENTION

1. Field of the Invention

The present invention relates to a transceiver adapted for mounting upon a strap of a facepiece (for example, such as a full face mask) or a headgear (for example, such as a helmet), and more particularly to such a transceiver which is downsized by using both a bone conduction speaker and a bone conduction microphone in its components so as to be mounted on the strap of the facepiece or on the strap of the headgear.

2. Description of the Related Art

As for a transceiver used by a user when he or she wears a gas mask or a helmet on his or her face or head portion, a conventional transceiver called "ear-mounted microphone, i.e., ear-microphone" having been heretofore widely used employs both a bone conduction speaker and a bone conduction microphone each capable of being used in a high-noise environment without picking up any ambient noise. Such an ear-microphone is classified into two types: an ear hook type used to attach the transceiver to the ear of the user; and, an earpiece insertion type adapted for insertion into the external auditory canal of the user. However, the conventional ear-microphone is poor in fittingness, and often drops out of the ear in use. Further, the conventional ear-microphone is also disadvantageous for the reason that it plugs up the ear of the user in use. Particularly, when the user wears a gas mask or helmet, it is difficult for the user to use the conventional ear-microphone. With respect to ordinary users or people who wear the gas masks or helmets, heretofore, no communication means suitable for them has been provided.

SUMMARY OF THE INVENTION

As described above, no communication means suitable for the ordinary users has been provided heretofore.

Consequently, it is an object of the present invention to provide a transceiver adapted for mounting upon a strap of a facepiece or a headgear, and more particularly to such a transceiver which is downsized by using both a bone conduction speaker and a bone conduction microphone in its components so as to be mounted on the strap of the facepiece or on the strap of the headgear, whereby the transceiver is improved in fittingness and enables the user to communicate with his other communication partner even when the user wears the facepiece such as a gas mask or the helmet.

In accordance with a first aspect of the present invention, the above object of the present invention is accomplished by providing:

A transceiver adapted for mounting upon a strap (11, 12) of a facepiece or a headgear, the transceiver comprising:

a rotatable casing (2) for receiving therein a bone conduction speaker and a bone conduction microphone;

a supporting member (5) for supporting the rotatable casing (2), wherein the rotatable casing (2) is pivoted to the supporting member (5); and engaging means (7, 8) engaging with the strap (11, 12) of the facepiece or the helmet.

In the transceiver having the above construction, preferably the engaging means (7, 8) has a substantially C-shaped form in side view to form a T-shaped slit therein.

Further, preferably the engaging means (7, 8) is constructed of a hook a gap of which is small.

In accordance with a second aspect of the present invention, the above object of the present invention is accomplished by providing:

A transceiver adapted for mounting upon a strap (11, 12) of a facepiece or a headgear, the transceiver comprising:

a communication receiving unit (3) constructed of a first rotatable casing (2a) and a supporting member (5a) for supporting the rotatable casing (2a) in a pivotal manner, wherein the first rotatable casing (2a) receives therein a bone conduction speaker;

a communication transmitting unit (4) constructed of a second rotatable casing (2a) and a second supporting member (5a) for supporting the second rotatable casing (2a) in a pivotal manner, wherein the second rotatable casing (2a) receives therein a bone conduction microphone; and engaging means (7a, 8a) engaging with the strap (11, 12) of the facepiece or the helmet, wherein the engaging means (7a, 8a) are provided on each of the first and second supporting members (5a);

whereby each of the units (3, 4) is capable of being used simultaneously with the use of the other, or capable of being used independently from one other.

In the transceiver having the above construction, preferably the engaging means (7a, 8a) has a substantially C-shaped form in side view to form a T-shaped slit therein.

Further, preferably the engaging means (7a, 8a) are constructed of a hook a gap of which is small.

BRIEF DESCRIPTION OF THE DRAWINGS

The above and other objects, advantages and features of the present invention will be more apparent from the following description taken in conjunction with the accompanying drawings in which.

DETAILED DESCRIPTION OF THE PREFERRED EMBODIMENTS

The best modes for carrying out the present invention will be described in detail using embodiments of the present invention with reference to the accompanying drawings.

Figure 1:
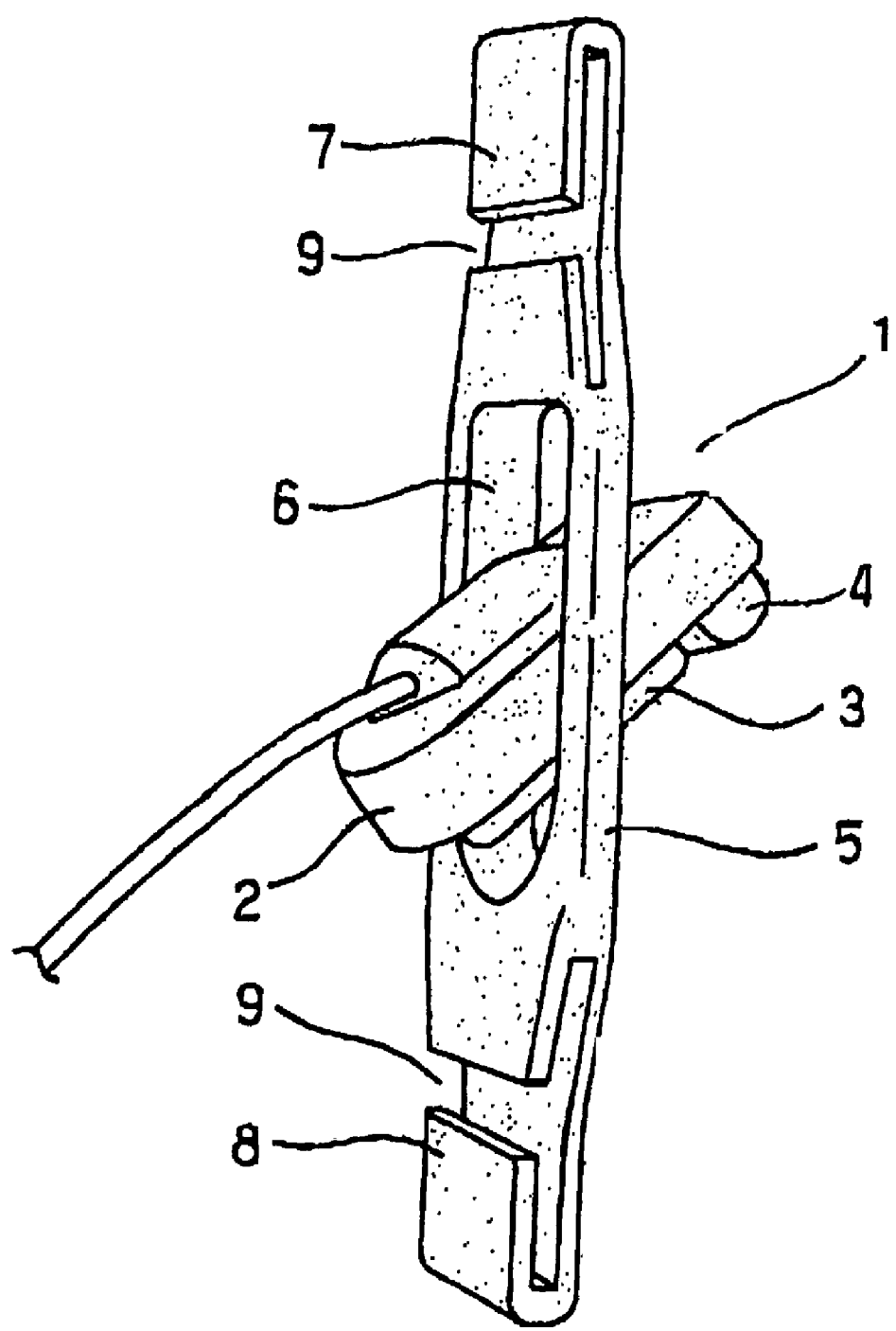
FIG. 1 is a perspective view of an embodiment of the transceiver of the present invention.
Figure 2:
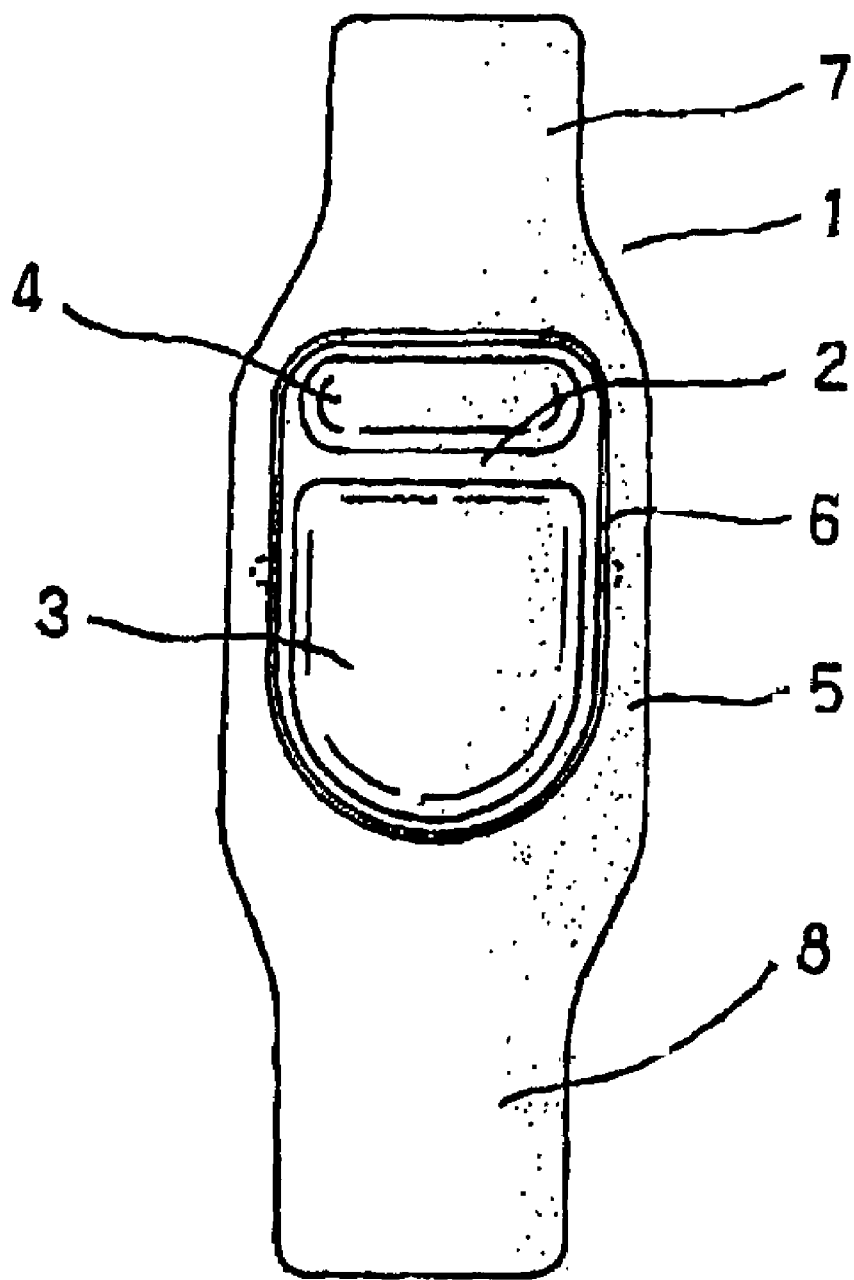
FIG. 2 is a front view of the embodiment of the transceiver of the present invention shown in FIG. 1.
Figure 3:
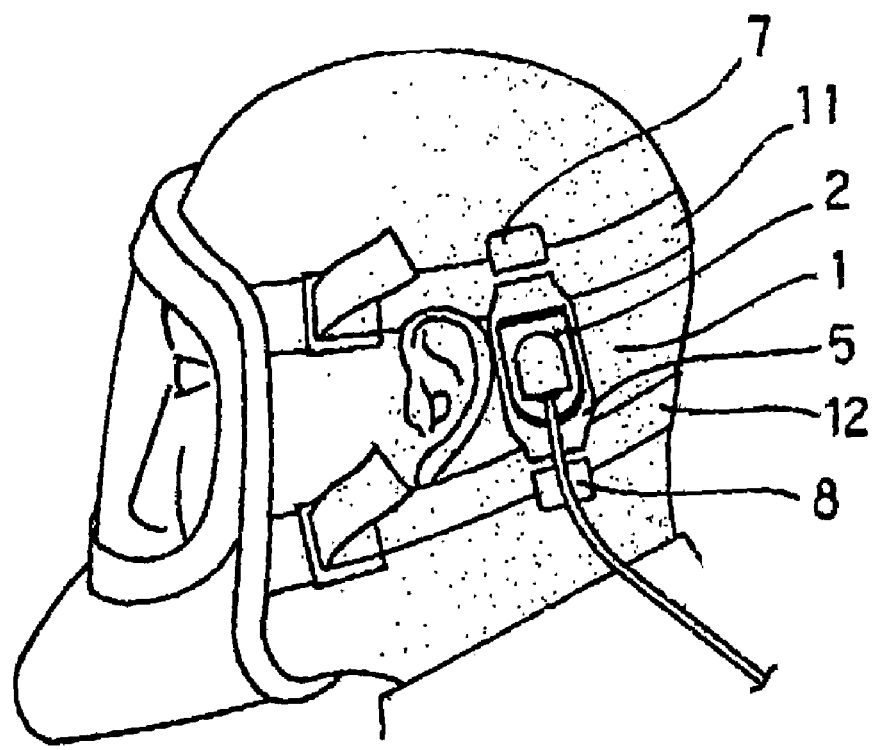
FIG. 3 is a perspective view of the transceiver of the present invention shown in FIG. 1 in use.

FIGS. 1 to 3 shows an embodiment of a transceiver 1 of the present invention. As is clear from the drawings, the transceiver 1 is constructed of: a rotatable casing 2 including both a bone conduction speaker portion 3 constructed of a bone conduction speaker and a bone conduction microphone portion 4 constructed of a bone conduction microphone; and, a supporting member 5 for supporting the rotatable casing 2 in a pivotal manner.

As for the bone conduction speaker portion 3 of the transceiver 1, it transmits a voice sound through a kinetic vibration called "bone conduction sound". In use, the bone conduction speaker portion 3 is brought into close contact with the head portion of the user in the vicinity of, preferably behind, the ear of the user. As for the bone conduction microphone portion 4 of the transceiver 1, it picks up the bone conduction sound as an electrical signal. In use, the bone conduction microphone portion 4 is also brought into close contact with the head portion of the user in the vicinity of, preferably behind, the ear of the user as is in the bone conduction speaker portion 3 of the same transceiver 1.

On the other hand, the supporting member 5 is provided with a central opening 6 for receiving therein the rotatable casing 2 in a pivotal manner. More specifically, the rotatable casing 2 is pivoted to each of intermediate portions of opposite inner sides of the central opening 6 of the supporting member 5. As shown in 1, the supporting member 5 is also provided with an upper engaging means or hook portion 7 and a lower engaging means of hook portion 8 in its upper and its lower portion, respectively.

As is clear from FIG. 1, each of the engaging means 7, 8 has a substantially C-shaped form in side view to form a T-shaped slit therein, and is provided with an intermediate lateral slit 9 through which each of the straps 11, 12 is inserted into each of the T-shaped slits of the engaging means 7, 8.

Figure 4:
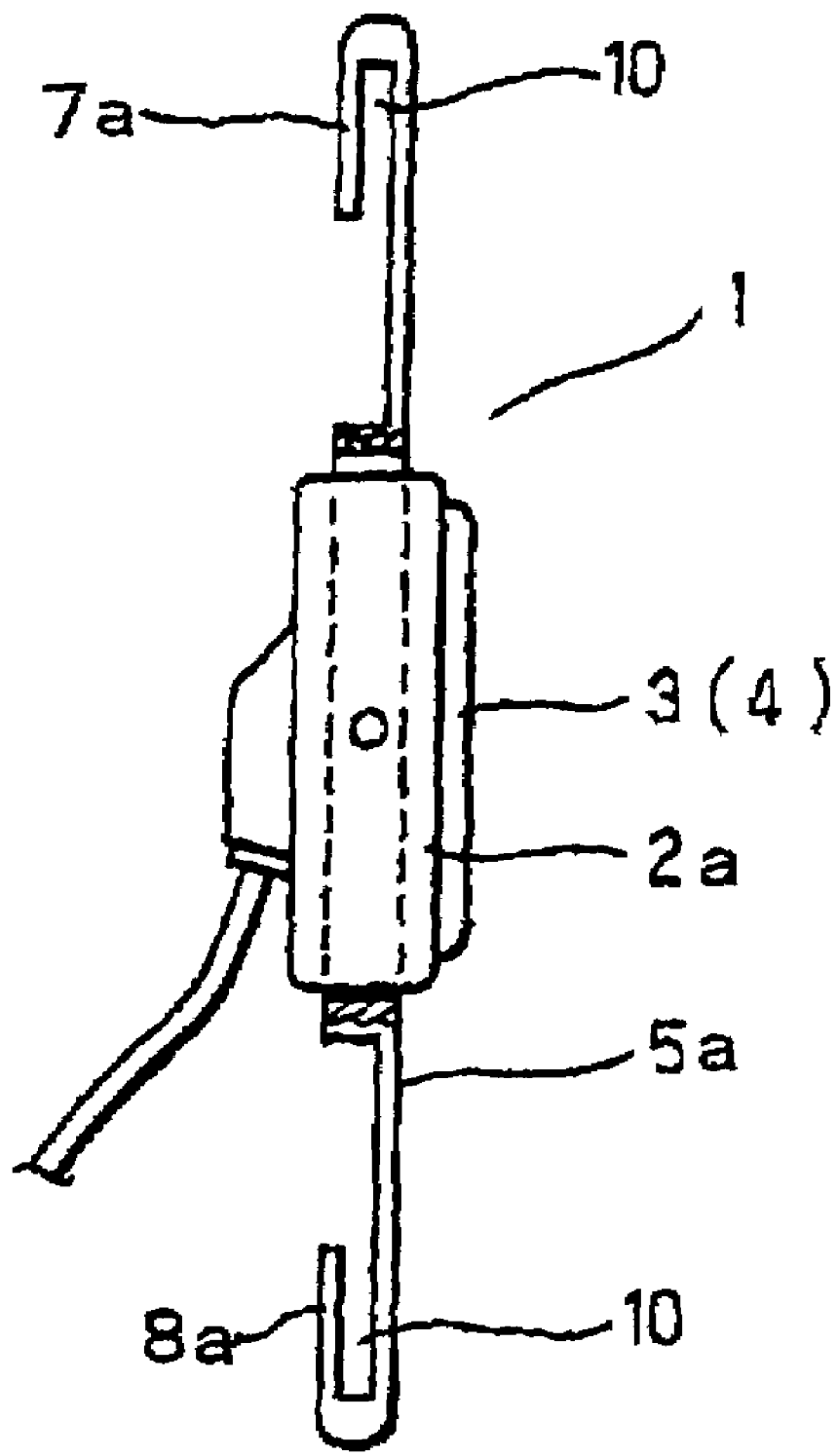
FIG. 4 is a side view of another embodiment the transceiver of the present invention.

FIG. 4 shows another embodiment of the transceiver 1 of the present invention provided with a pair of engaging means or hooks 7a, 8a. Each of the engaging means 7a, 8a is constructed of a simple hook member to facilitate insertion of each of the straps 11, 12 into such a simple hook member. Each of the engaging means or hook members 7a, 8a has a small gap 10 which substantially corresponds to a thickness of each of the straps 11, 12. In this embodiment shown in FIG. 4, in comparison with the embodiment shown in FIG. 1, though insertion of the straps 11, 12 into the hook members 7a, 8a is facilitated, there is a fear that thus inserted straps 11, 12 drop out of the hook members 7a, 8a in use since the hook members 7a, 8a are lower in holding power or stability than the engaging means 7, 8 of the embodiment shown in FIG. 1. Consequently, in reliability, the embodiment shown in FIG. 4 is lower than the embodiment shown in FIG. 1.

In the embodiment of FIGS. 1–3, both the bone conduction speaker portion 3 and the bone conduction microphone portion 4 are received in the same rotatable casing 2. However, it is also possible to employ a pair of identical rotatable casings 2a (one of which is shown in FIG. 4) receiving therein the bone conduction speaker portion 3 and the other the bone conduction microphone portion 4 separately from each other. In this case, each of the rotatable casings 2a is pivoted to identical supporting members 5a separately from each other. In other words, as for the embodiment of the transceiver shown in FIG. 4, the transceiver 1 permits the user to use its speaker unit and its microphone unit simultaneously with each other on opposite sides of the user's head or independently from each other.

In any one of the above embodiments of the present invention, it is possible for the user to have both the bone conduction speaker portion 3 and the bone conduction microphone portion 4 brought into close contact with his or her head portion in the vicinity of, preferably behind, his or her ear with a suitable contact pressure to stabilize the transceiver 1 in use and improve its fittingness by appropriately tightening the straps 11, 12, after the transceiver 1 is mounted on these straps 11, 12. Since the rotatable casing 2 is capable of rotating relative to the supporting member 5 in construction, it is possible for the user to improve the transceiver 1 in fittingness in accordance with his or her head profile by properly rotating the rotatable casing 2 relative to the supporting member 5.

Due to this, it is possible for the user to communicate with his or her communication partner even when the user works hard physically. Further, the transceiver 1 of the present invention is much more improved in stability and therefore in reliability than any of the conventional ear-microphones including the ear hook type and the earpiece insertion type, and permits the user to use the transceiver 1 in a high-noise environment without picking up any ambient noise.

Incidentally, in the case where the bone conduction speaker portion 3 and the bone conduction microphone portion 4 are separated from each other in construction as is in the embodiment shown in FIG. 4, it is possible for the user to use a communication receiving unit (which is constructed of the bone conduction speaker portion 3 only) independently from a communication transmitting unit (which is constructed of the bone conduction microphone portion 4 only), or vice versa. It is natural that the user is capable of using the communication receiving unit of the transceiver 1 simultaneously with the communication transmitting unit of the same transceiver 1.

Since the transceiver 1 of the present invention has the above construction, it is possible for the user to easily mount the transceiver 1 on the straps of any one of masks, helmets and like items, for example such as gas masks, working masks, diving masks, safety helmets and the like. It is also possible for the user to have the facepiece or headgear (for example, such as the gas mask or the helmet) mounted on or removed from his or her head portion in a condition in which the transceiver 2 is mounted on the facepiece or headgear. The transceiver 1 of the present invention is also easy in positioning thereof relative to the head portion of the user to stabilize the transceiver 1 in use. Further, the rotatable casing 2 of the transceiver 1 remarkably contributes to the easiness in use of the transceiver 1 to improve the transceiver 1 in fittingness and in reliability in communication.

Finally, the present application claims the Convention Priority based on Japanese Patent Application No. 2001-331870 filed on Oct. 30, 2001, which is herein incorporated by reference.

What is claimed is:

1. A transceiver adapted for mounting between a pair of flexible straps (11, 12) of a facepiece or a headgear behind an ear on the head of a user, the transceiver comprising:
 a single casing (2) having both a bone conduction speaker and a bone conduction microphone therein;
 a supporting member (5) having engaging means on opposite ends thereof for respective engagement to said flexible straps; and
 wherein said casing is rotatably mounted on pivots in an opening in said supporting member to facilitate engagement of the bone conduction speaker and the bone conduction microphone against the head of the user.

2. The transceiver as set forth in claim 1, wherein: said engaging means (7, 8) has a substantially C-shaped form in side view to form a T-shaped slit therein.

3. The transceiver as set forth in claim 1, wherein said engaging means (7, 8) is constructed of a hook a gap of which is small.

4. A transceiver adapted for mounting between a pair of flexible straps (11, 12) of a faceplate or a headgear behind an ear on the head of a user, the transceiver comprising:
 a communication receiving unit having a first casing having a bone conduction speaker therein;
 a first supporting member having engaging means on opposite ends thereof for respective engagement to said flexible straps;
 wherein said first casing is rotatably mounted on pivots in an opening in said first supporting member to facilitate engagement of the bone conduction speaker against a one side of the head of the user;
 a communication transmitting unit having a second casing having a bone conduction microphone therein;

a second supporting member having engaging means on opposite ends thereof for respective engagement to said flexible straps;

wherein said second casing is rotatably mounted on pivots in an opening in said second supporting member to facilitate engagement of the bone conduction microphone against another side of the head of the user;

wherein said communication receiving unit and said communication transmitting unit are used simultaneously with each other on opposite sides of the head of the user or one at a time on one side of the head of the user.

5. The transceiver as set forth in claim 4, wherein said first and second engaging means have a substantially C-shaped form in side view to form a T-shaped slit therein.

6. The transceiver as set forth in claim 4, wherein said first and second engaging means are constructed of a hook (7a, 8a) a gap of which is small.

* * * * *